US008255883B2

(12) United States Patent
Sceppa et al.

(10) Patent No.: US 8,255,883 B2
(45) Date of Patent: Aug. 28, 2012

(54) TRANSLATING LATE BOUND LINQ EXPRESSIONS INTO DATABASE QUERIES

(75) Inventors: David E Sceppa, Seattle, WA (US); Carl Y Perry, Woodinville, WA (US); Jeffrey M Derstadt, Seattle, WA (US); Andrew J Conrad, Sammamish, WA (US); Amanda K Silver, Seattle, WA (US); Paul A Vick, Seattle, WA (US); Shyamalan Pather, Seattle, WA (US); Colin Joseph Meek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1184 days.

(21) Appl. No.: 11/940,029

(22) Filed: Nov. 14, 2007

(65) Prior Publication Data
US 2008/0263063 A1 Oct. 23, 2008

Related U.S. Application Data

(60) Provisional application No. 60/913,186, filed on Apr. 20, 2007, provisional application No. 60/913,183, filed on Apr. 20, 2007, provisional application No. 60/913,810, filed on Apr. 24, 2007.

(51) Int. Cl.
*G06F 9/44* (2006.01)
(52) U.S. Cl. ...................................... 717/136
(58) Field of Classification Search ............... None
See application file for complete search history.

(56) References Cited

U.S. PATENT DOCUMENTS

| | | | |
|---|---|---|---|
| 5,295,256 A | 3/1994 | Bapat | |
| 5,315,709 A | 5/1994 | Alston, Jr. et al. | |
| 5,475,843 A | 12/1995 | Halviatti et al. | |
| 5,900,870 A | 5/1999 | Malone et al. | |
| 5,940,075 A | 8/1999 | Mutschler, III et al. | |
| 6,006,242 A | 12/1999 | Poole et al. | |
| 6,065,012 A | 5/2000 | Balsara et al. | |
| 6,496,835 B2 | 12/2002 | Liu et al. | |
| 6,792,607 B1 | 9/2004 | Burd et al. | |
| 6,799,320 B1 * | 9/2004 | Elvanoglu et al. | 719/331 |
| 6,961,750 B1 | 11/2005 | Burd et al. | |
| 7,100,153 B1 | 8/2006 | Ringseth | |
| 7,127,474 B2 | 10/2006 | Williamson et al. | |
| 7,468,731 B2 | 12/2008 | Eldridge et al. | |
| 7,779,397 B2 * | 8/2010 | Meijer et al. | 717/140 |

(Continued)

FOREIGN PATENT DOCUMENTS
WO 2006130871 A2 12/2006

OTHER PUBLICATIONS

"The ADO.NET Entity Framework Overview", Jun. 2006, retrieved from http://msdn.microsoft.com/en-us/library/aa697427, on Jul. 29, 2011.*

(Continued)

*Primary Examiner* — Philip Wang

(57) ABSTRACT

There is alteration of a late-bound expression produced by a compiler into an early-bound structure. Alteration of the late-bound expression can occur at runtime and a visitor pattern can be used to create the alteration. In one instance, a conversion from late-bound to early-bound takes place through replacing a late-bound property with a statically typed call. The early-bound structure can translate into an expression tree to enable an implementation of a store specific query operated upon storage.

20 Claims, 11 Drawing Sheets

U.S. PATENT DOCUMENTS

| | | | |
|---|---|---|---|
| 2004/0107183 | A1 | 6/2004 | Mangan |
| 2004/0210445 | A1 | 10/2004 | Veronese et al. |
| 2004/0267760 | A1 | 12/2004 | Brundage et al. |
| 2005/0102649 | A1 | 5/2005 | Hogg et al. |
| 2005/0172264 | A1 | 8/2005 | Yuknewicz et al. |
| 2005/0289457 | A1 | 12/2005 | Obasanjo et al. |
| 2006/0015485 | A1 | 1/2006 | Hofmann |
| 2006/0074873 | A1 | 4/2006 | Dettinger et al. |
| 2006/0074981 | A1 | 4/2006 | Mauceri, Jr. et al. |
| 2006/0074994 | A1 | 4/2006 | Smits |
| 2006/0085342 | A1 | 4/2006 | Chen et al. |
| 2006/0150172 | A1 | 7/2006 | Heath et al. |
| 2006/0167880 | A1 | 7/2006 | Meijer et al. |
| 2006/0173863 | A1 | 8/2006 | Paulus et al. |
| 2006/0195425 | A1* | 8/2006 | Deem et al. ................ 707/3 |
| 2007/0038666 | A1 | 2/2007 | Meijer et al. |
| 2007/0050380 | A1 | 3/2007 | Meijer et al. |
| 2007/0074185 | A1 | 3/2007 | Meijer et al. |
| 2007/0094647 | A1* | 4/2007 | Meijer et al. ............ 717/140 |
| 2007/0226203 | A1* | 9/2007 | Adya et al. ................ 707/4 |

OTHER PUBLICATIONS

Attali Isabelle, et al., "A Natural Semantics for Eiffel Dynamic Binding", http://delivery.acm.org/10.1145/240000/236118/p711-attali.pdf?key1=236118&key2=8801100811&coll=GUIDE&dl=GUIDE&CFID=23471572&CFTOKEN=40029597, ACM Transactions on Programming Languages and Systems, vol. 18, No. 6, Nov. 1996, pp. 711729.

"Data Binding Overview", http://msdn2.microsoft.com/en-us/library/ms752347.aspx, MSDA, © 2007 Microsoft Corporation, 12 pages.

Ogbuji, "Introducing Anobind", http://www.xml.com/pub/a/2003/08/13/py-xml.html, last accessed on Aug. 16, 2007, 7 pages, Aug. 13, 2003.

"Smart Software", http://wesnerm.blogs.com/net_undocumented/2005/09/index.html, Sep. 24, 2005, 13 pages.

"DevHawk—Development", http :// devhawk.net / SyndicationService. asmx / GetRssCategory ?categoryName = Development, last accessed Aug. 17, 2007, Tuesday, Mar. 14, 2006, 7 pages.

Meijer, Eric, "Functional Programming Has Reached the Masses; It's Called Visual Basic", http://lambda-the-ultimate.org/node/1406, last acessed on Aug. 16, 2007, Apr. 9, 2006, 7 pages.

Blakeley, et al., "The ADO.NET Entity Framework: Making the Conceptual Level Real", http://delivery.acm.org/10.1145/1230000/1228275/p32-blakeley.pdfkey1=1228275&key2=9264899711&coll=GUIDE&dl=GUIDE&CFID=19482078&CFTOKEN=71907954, Microsoft Corporation, One Microsoft Way, Redmond, WA 98052-6399, USA, SIGMOD Record, vol. 35, No. 4, Dec. 2006, 8 Pages.

"OakLeaf Systems", http://www.blogger.com/feeds/11646261/posts/default, Last accessed on Aug. 17, 2007, Friday, May 4, 2007, 11 pages.

Final Office Action for U.S. Appl. No. 11/838,705, dated Apr. 30, 2010, 46 pages.

Non-Final Office Action for U.S. Appl. No. 11/838,705, dated Sep. 21, 2009, 24 pages.

"International Search Report", Mailed Date: Apr. 28, 2011, Application No. PCT/US2008/057749, Filed Date: Mar. 20, 2008, pp. 9.

Pyster, Arthur , "Using assertions to improve language translators", National Computer Conference, Jun. 13-16, 1977, pp. 665-668.

Chen, Yifeng., "A Language of Flexible Objects", Retrieved at <<citeseerx.ist.psu.edu/viewdoc/download?doi=10.1.1.59.9813...pdf>>, Technical Report 29, 2004, pp. 11.

Pyster, A. Using assertions to improve language translators, In: 1977 ACM National Computer Conference, New York: ACM, Jun. 13-16, 1977, pp. 665-668 (Pyster. A.).

Chen, Y. A language of flexible objects. Technical Report 29, Department of Computer Science, Leicester University, 2004. (Chen, Y.) See chapter 3.

International Search Report for PCT Patent Application No. PCT/US2008/057749 dated Apr. 28, 2011, 9 pages.

* cited by examiner

TRANSLATING LATE BOUND LINQ EXPRESSIONS INTO DATABASE QUERIES

CROSS-REFERENCE

This application claims priority to U.S. Provisional Application Ser. No. 60/913,186 entitled "TRANSLATING LATE BOUND LINQ EXPRESSIONS INTO DATABASE QUERIES" filed on Apr. 20, 2007. The entirety of which is incorporated by reference herein.

This application additionally claims priority to U.S. Provisional Application Ser. No. 60/913,183 entitled "AUTOMATIC DATABINDING BINDING OF DYNAMICALLY/RUNTIME GENERATED TYPES TO FORMS" filed on Apr. 20, 2007. The entirety of which is incorporated by reference herein.

This application also claims priority to U.S. Provisional Application Ser. No. 60/913,180 entitled "GENERATION OF RUNTIME TYPES AND EXTENSIBILITY OF NAME GENERATION" filed on Apr. 20, 2007. The entirety of which is incorporated by reference herein.

TECHNICAL FIELD

The subject specification relates generally to data structures and in particular to translation of data structure expressions.

BACKGROUND

Technology advancements and cost reductions over time have enabled computers to become commonplace in society. Enterprises employ computers to collect and analyze data. For instance, computers can be employed to capture data about business customers that can be utilized to track sales and/or customer demographics. Further yet, individuals also interact with a plurality of non-enterprise computing devices including home computers, laptops, personal digital assistants, digital video and picture cameras, mobile devices, etc. As a consequence of computer ubiquity, an enormous quantity of digital data is generated daily by both enterprises and individuals.

Computer operations are commonly performed through instruction sets generally referred to as a programming languages. Programming languages are conventionally based upon a common syntax that enables a programmer to write commands in the language. For instance, entry of '++' allows a number to be incremented in some programming languages. It is possible that various operators perform conflicting commands between two different programming languages— moreover, functions can be performed by separate commands. In an illustrative instance, to call a function, one language can use 'printf' while a separate language uses 'disp'.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

Conventionally, compilers generate late-bound expressions that are used at runtime to perform a computer operation. While late-bound expressions are adequate in certain contexts, there can be a number of problems in their use. For instance, late-bound expressions can cause errors since classes are presumed to exist—it is possible classes are called that do not exist, thus causing a system error. In addition, use of classic late-bound expressions does not allow queries to be run on storage devices within a framework implementation.

The subject innovation modifies a late-bound structure output of a compiler into an early-bound structure. Modification takes place through replacing a late-bound property accessor with an early-bound call. The early-bound structure can translate into an expression tree such that the expression tree allows generation of a store specific query operated upon a database. Modification of the late-bound expression can occur at runtime, where a visitor pattern is used to create the modification.

The subject innovation goes against common industry thought and market trends. When a compiler produces a late-bound structure, it appears logical to use the compile product at runtime, since it requires virtually no additional actions— other implementations would appear illogical since they would take longer time and be susceptible to errors. However, translation from an early-bound expression to a late-bound expression produces an unexpected result that allows the expression to implement as a query, such as a database query.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
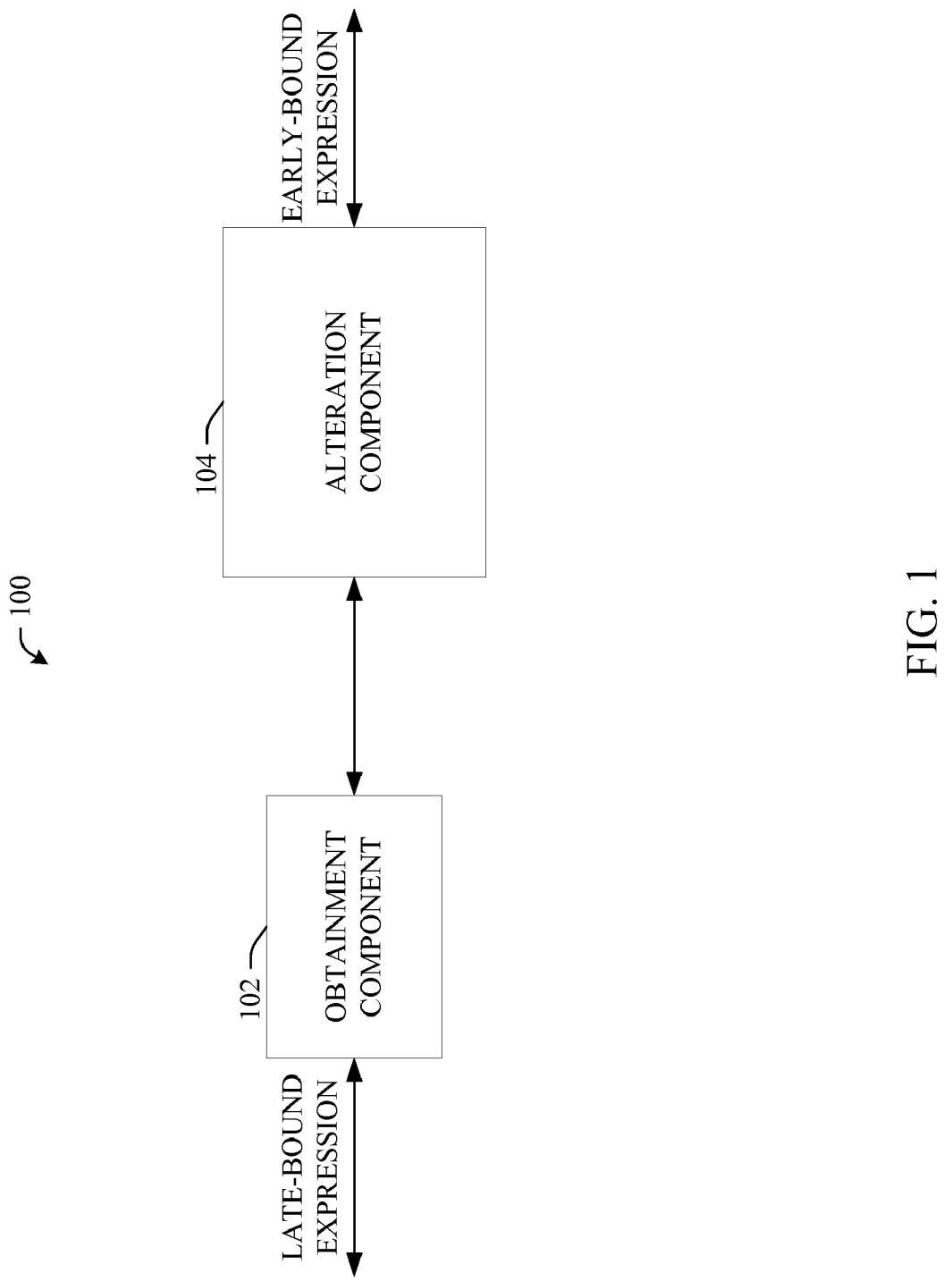
FIG. 1 illustrates a representative system for conversion of a late-bound expression to an early-bound expression in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Certain computer programming frameworks (e.g., standard query operator defining constructs, such as LINQ) allow developers to write code to access structures in memory and/or allow developers to translate information into a remote call using constructs that are familiar to developers who have worked with database queries, such as structured query language queries (e.g., SQL queries).

Dim contacts As New List(Of Contact)( )
    contacts.Add(New Contact("Contact1", "First Customer", . . . ))
    contacts.Add(New Contact("Contact2", "Second Customer", . . . ))
    Dim query=From c In context.Contacts Where c.Age>40_ Select c Order By c.LastName Developers can use familiar clauses like 'Where' and 'Order By', just as they would with a database query and the collection will return an appropriate results.

With standard database queries, the query is expressed as a string and validation occurs at run-time. Invalid data type comparisons, typos, etc. are not detected until run-time in a general case. With framework queries, a language compiler validates a query at compile time using metadata for classes referenced in the query. For example, in the previous query, the compiler knows about the data type for the Contact class' Age property and knows how to evaluate the comparison to 40.

A developer can express a similar query. Developers can use a framework to map classes and properties to database tables and columns. The framework then translates the query at runtime to a database query, executes the query, and returns the results in terms of the class(es) specified.

Dim context As New AdventureWorksContext( )
    Dim query=From c In context.Contacts Where c.Age>40_ Select c Order By c.LastName A developer can construct a similar framework query:

Dim contacts As IQuery=context.Contacts
    Dim query=From c In context.Contacts Where c.Age>40_ Select c Order By c.LastName In this example, the Contact class does not exist at compile time. There is creation of the class at runtime during the call to DynamicContext.CreateContext.

The code compiles because some languages can support a late-bound mode, deferring validation of code until runtime. There is little to no enforcement of type checking until runtime (e.g., at compile time). It assumes that the context object will have a Contacts property at runtime, and that the objects returned by the Contacts property will have properties for Age and LastName. This process is generally referred to as late binding.

At runtime, late-bound language code (e.g., from an event driven programming language) becomes a late-bound framework expression, but the late-bound framework expression cannot typically be translated into a database query via conventional mechanisms. The innovation addresses this problem.

FIG. 1 discloses an example system 100 for translating a late-bound expression into an early-bound expression. When operating with a late-bound expression, it is commonly not known if a property of an object will exist until a program is run. If the property does not exist, then various runtime errors can take place, causing application difficulties. With use of an early-bound expression, it can be known what classes/properties exist, thus eliminating errors that are caused by calling non-existent classes.

For example, if there is an object with a type person with a property age, when an early-bound call is performed, an analysis takes place upon a type and code is directly placed into the early-bound call. When operating in a late-bound context, it is not known if there is an age property or not until a program is run. In a late-bound case, a compiler injects a portion of code to examine at runtime if there is an age property, and then a property is called.

A compiler component transfers a late-bound expression to an obtainment component 102, where the obtainment component 102 collects a late-bound structure. The obtainment component 102 can configure in a number of different embodiments. In one implementation, the obtainment component 102 seeks out various compiler components. When a compiler component produces an expression, the obtainment component 102 extracts the expression and retains the expression in local storage. However, the obtainment component 102 can also operate as a passive unit, which receives information transmitted from a compiler component. The obtainment component 102 can operate in a wireless manner, hardwired manner, etc.

The obtainment component 102 conveys the late-bound expression to an alteration component 104. The alteration component 104 converts a late-bound structure into an early-bound structure—commonly operating at runtime (e.g., operation of computer program execution). The alteration component 104 can operate as a means for translating a late-bound expression into an early-bound expression.

Figure 2:
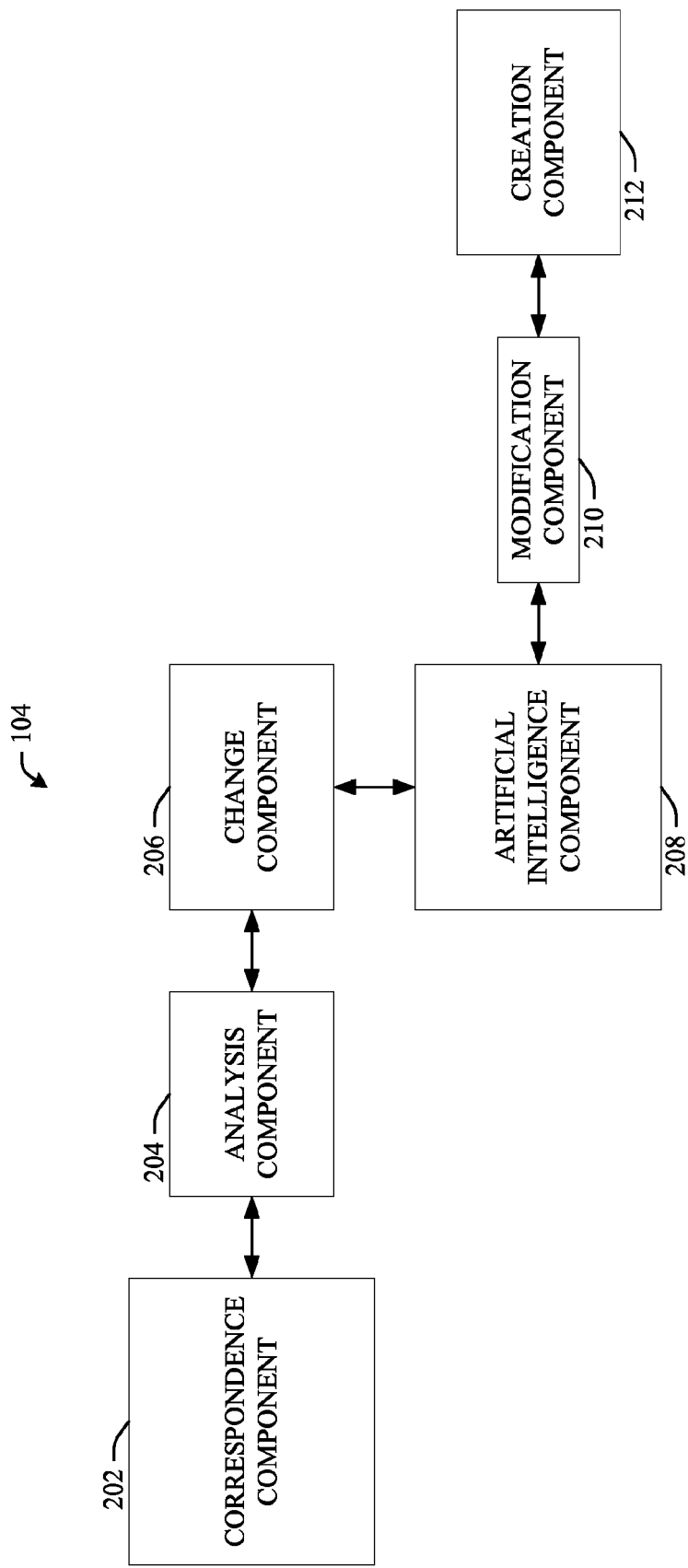
FIG. 2 illustrates a representative alteration component in accordance with an aspect of the subject specification.

FIG. 2 discloses an example alteration component 104 in accordance with an aspect of the subject specification. A correspondence component 202 enables the alteration component 104 to interact with other units (e.g., a compiler component). The correspondence component 202 can be utilized to enable devices of the alteration component 104 to engage other devices in a wireless manner, through a hard wire configuration, etc. Security features can be implemented by the correspondence component 202, such as checking for errors that can disrupt the alteration component 104 and/or the system 100 of FIG. 1 (e.g., if a compiler is not operating appropriately, then mistakes can be identified by the correspondence component 202 and attempted repairs can take place.) The correspondence component 202 can function as a means for passing the early-bound expression to an entity implementation.

An analysis component 204 evaluates the collected late-bound structure. In order to change a late-bound structure into an early-bound structure, characteristics should be ascertained relating to the structure. For instance, the analysis component 204 can use a visitor pattern to convert the collected late-bound structure. A visitor pattern is a behavioral type of design pattern that separates an algorithm from an object structure. Use of the visitor pattern enables new functionality to be added to objects. Thus, new methods can be added to an existing hierarchy, without modifying the hierarchy. The analysis component 204 can operate as a means for analyzing the late-bound expression.

A change component 206 transforms at least a portion of the structure to a strong type. Strong typing allows information to be checked in such a manner that there are minimal errors that can take place at runtime. In an illustrative embodiment, data types of a compiled structure can be allocated restrictions so modification cannot take place upon the types that would cause an error.

There can be a rewrite of a query expression tree by replacing the expression of late-bound calls with early-bound calls. Since expressions are generic types where the return type of the expression is the generic parameter—this means there is also a creation of new expressions (e.g., during rewrite) where the return type is strongly typed versus the expression in the late-bound tree where the return type was weakly typed (e.g., object).

Artificial intelligence component 208 makes at least one inference or at least one determination about conversion of the late-bound structure into the early-bound structure. Various scenarios can occur that are processed by the artificial intelligence component 208; artificial intelligence component 208 can function as a processor for the alteration component 104. As an example, the artificial intelligence component 208 can infer when a compiler component has finished sending a late-bound expression (e.g., an amount of time has passed with no data transmission from the compiler component). In addition, the artificial intelligence component 208 can make a determination, such as how quickly an operation should take.

Artificial intelligence component 208 can employ one of numerous methodologies for learning from data and then drawing inferences and/or making determinations related to profile creation (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

A modification component 210 arranges the early-bound structure into a tree. A tree allows for a breakdown of an operation to be followed in a dependent manner—various constructs are dependent upon other constructs. In an illustrative example, a comparator can relate toward two arguments—without the arguments, there would be little to compare. The modification component 210 can operate as a means for modifying the early-bound query to a tree.

A creation component 212 generates a store-specific query based upon the early-bound structure. The creation component 212 allows an ability to translate the early-bound expression into database queries (e.g., DbCommands) that can execute against a database. Operation of the creation component 212 allows leveraging of a framework remainder. The creation component 212 can operate as a means for generating a store specific query based upon the early-bound expression.

Figure 3:
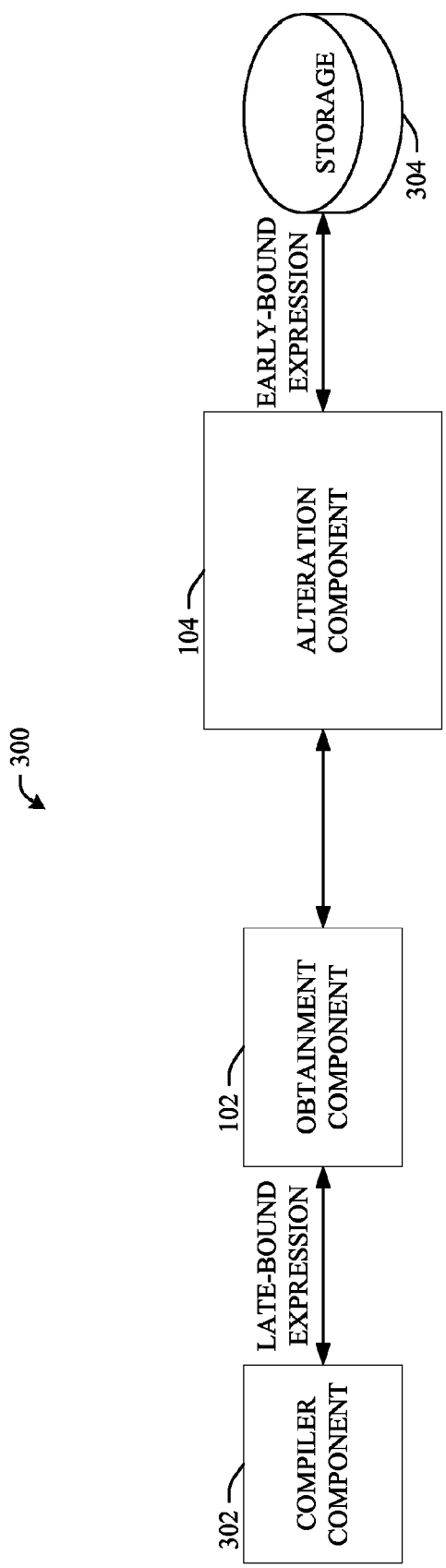
FIG. 3 illustrates a representative system with a compiler component and storage in accordance with an aspect of the subject specification.

FIG. 3 discloses an example system 300 disclosing additional operation units for translation of a late-bound expression to an early-bound expression. A compiler component 302 modifies source language into a target language; output of the compiler component 302 is generally a late-bound expression. There can be support for compile checking against the types generated such that the compiler would tell items such as types that did not match or the property that will not be there at run time. The compiler component 302 can function as a means for changing source code into the late-bound expression. The compiler component 302 can support checking against the types would be generated such that the compiler component 302 would disclose items such as types did not match or that a property will not be there at run time, etc.

An obtainment component 102 collects a late-bound structure produced by the compiler component 302. A transfer component 104 converts a late-bound structure into an early-bound structure. The transfer component 104 can modify the early-bound structure into a tree (e.g., a DbCommandTree) that enables development of a store specific query.

A store specific query is operated upon storage 304, commonly to obtain information from a database (e.g., though a structured query language). Storage 304 can have a number of different configurations, including as flash memory, battery backed memory, magnetic tape, hard disk, etc. The alteration component 104 can configure to operate the query upon the storage (e.g., though utilization of the creation component 212 of FIG. 2) and to transfer results of the query to an auxiliary location (e.g., transmission from the correspondence component 202). Various other components can utilize the storage 304. For instance, the obtainment component 102 can place gathered contents upon the storage 304 and operations are performed upon saved gathered contents.

Figure 4:
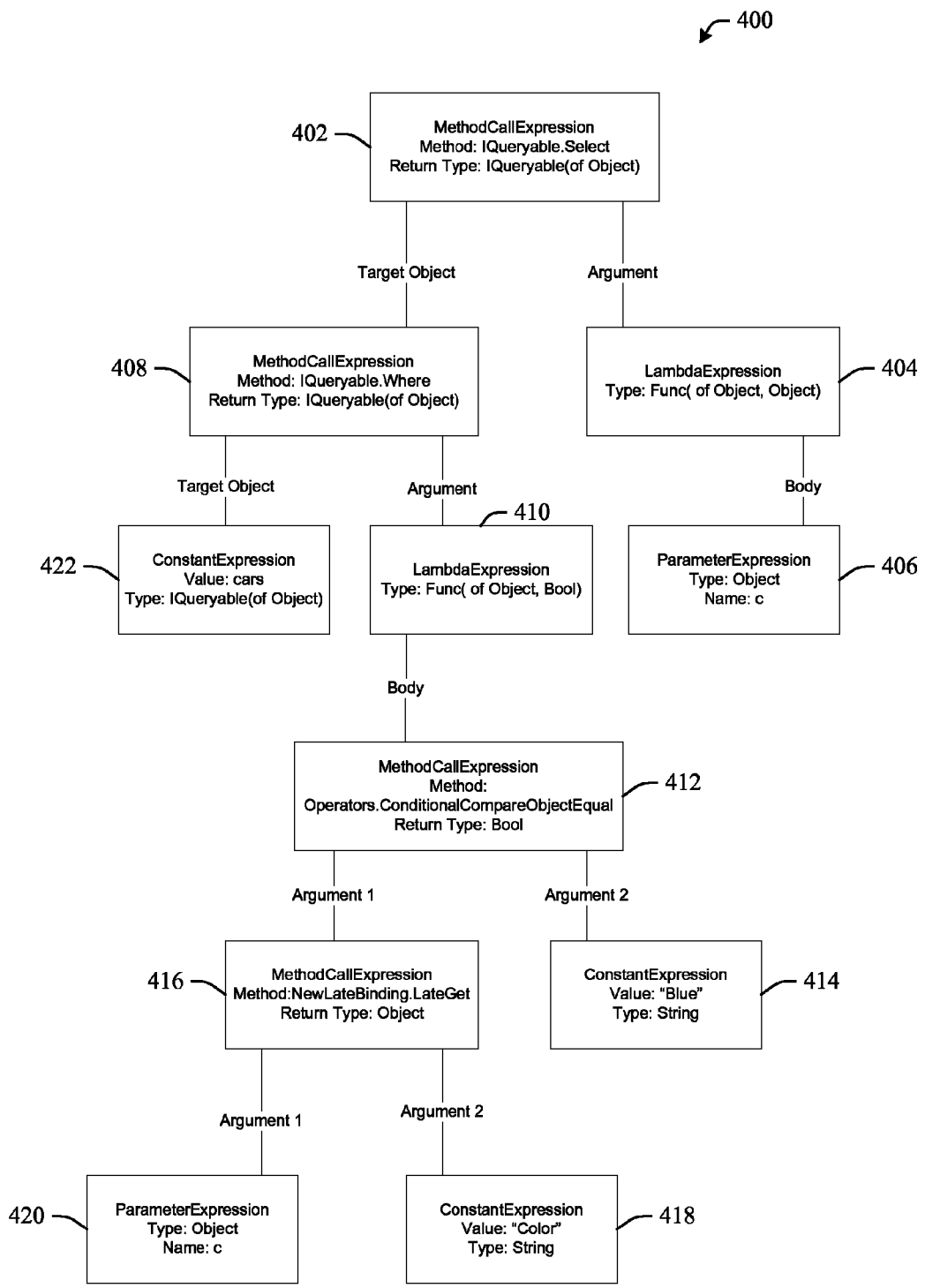
FIG. 4 illustrates a representative late-bound expression in accordance with an aspect of the subject specification.

FIG. 4 discloses an example tree 400 that enters the obtainment component 102 of FIG. 1. FIG. 4 can use a declaration:

Dim cars As IQueryable(Of Object)=(New List(Of Object)).AsQueryable( )

In addition, FIG. 4 can use an expression:

Dim query=From c In cars__
Where c.color="Blue"__
Select c

The tree 400 discloses how the expression is being evaluated. Method 402 makes a call to a method to envoke the method and thus executes the method (e.g., IQueryable is an interface associated with the method). The request 402 returns an object and breaks down into an object and an argument 404. The argument 404 is a lambda expression and can output an object instance 406.

A where method call 408 from the expression provides an execution of a preconditioned method. Another lambda expression 410 is exposed, thus producing a comparator 412 (e.g., an equal sign). A string 414 is used to specify characteristics sought in a query expression. A method 416 is used to operate the 'c.color' to determine if 'c' has a property 'color'. There will commonly be object metadata stating a consistent color property 418 and an object identifier 420, thus binding the color to the object. In addition, the method call 408 can output an expression 422.

Figure 5:
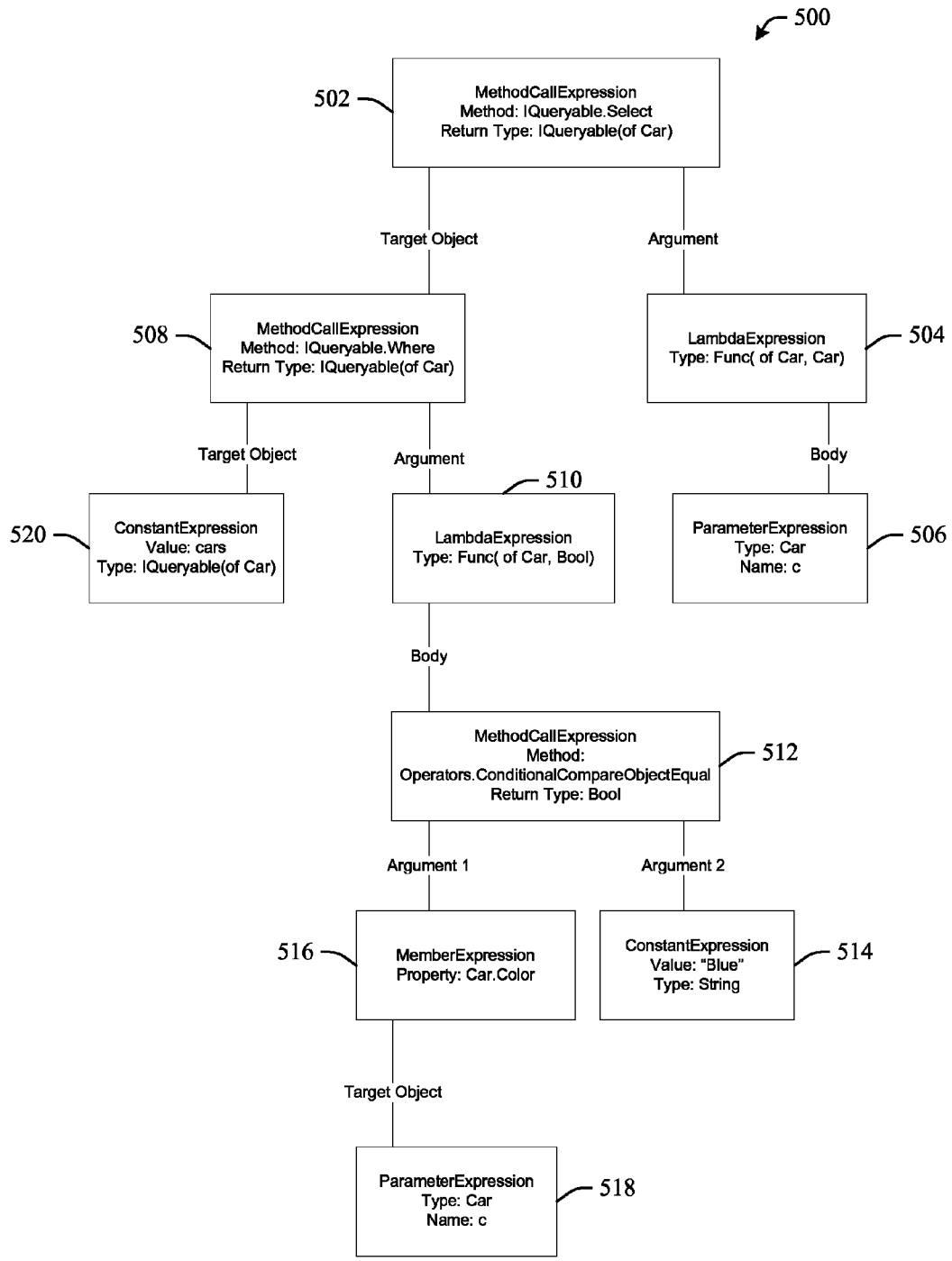
FIG. 5 illustrates a representative early-bound expression in accordance with an aspect of the subject specification.

FIG. 5 discloses an example tree 500 that exits the transfer component 104 of FIG. 1. FIG. 5 can use the same declaration and expression as disclosed in FIG. 4. General principles of tree leaves of the tree 400 are used, except that the variable term 'object' (e.g., return type) is bound to the specific object 'Car', therefore transferring the expression from late-bound to early bound.

The tree 500 discloses how the expression is being evaluated. Request 502 makes a call to a method to envoke the method and thus execute the method (e.g., IQueryable is an interface associated with the method). The request 502 returns an object and breaks down into an object and an argument 504. The argument 504 is a lambda expression and can output an object instance 506.

A where method call 508 can enable execution a preconditioned method. Another lambda expression 510 is exposed, thus producing a comparator 512 (e.g., an equal sign). A string 514 is used to determine characteristics of a color 'blue'. Latebindings (e.g., the method 416, property 418 and identifier 420 of FIG. 4) are removed and replaced with a statically typed call 516 and an object identifier 518. Moreover, the method call 508 can output an expression 520 valued at cars of car.

Operation of the tree 500 creates a static type for 'cars' at runtime. It is understood that objects in 'cars' is a car, and the type was not generated. Therefore, a static type is created car (e.g., through utilization of artificial intelligence techniques). It knows what 'car' is and properties concerning 'car', so a statically typed call can be automatically made.

Figure 6:
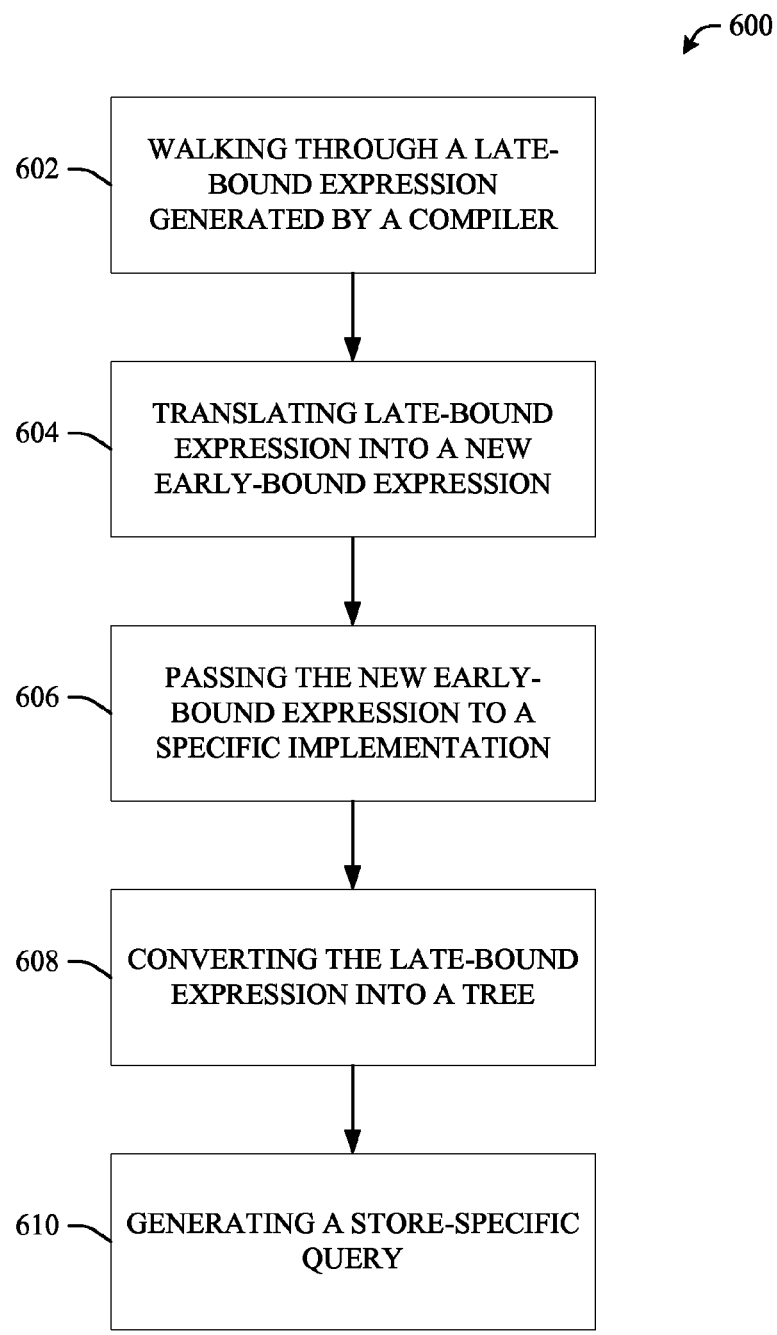
FIG. 6 illustrates a representative query generation methodology in accordance with an aspect of the subject specification.

FIG. 6 discloses an example methodology 600 for operating a query upon a database. There is walking through a late-bound expression generated by a compiler 602. Walking through provide evaluated characteristics that can be used to transform a late-bound expression. Examination of an object can take place in order to determine a return type. For instance, if there is a generic object, then walking through can determine that the object is specifically 'cars'.

Translating late-bound expressions into a new early-bound expression 604 occurs. Action 604 takes place through replacing of at least one method call of the late-bound expression with a statically typed call. Translation allows for types of the expression to convert to strongly typed since types can be known due to the replaced method calls.

Passing the new early-bound expression to a specific implementation 606 takes place. Event 608 is converting the early-bound expression into a tree. The combination of act 606 and event 608 enables alters the early-bound expression into a flow structure.

There is generating a store-specific query 610. A store-specific query allows information to be retrieved from a database. For instance, a programmer can write programming code intended to run a query upon a database (e.g., a request to call cars that are colored blue). A compiler outputs a late-bound expression showing an object and translation of the expression converts the object to a specific term 'cars' at runtime. A query is then applied in a framework implementation to return a list of cars that are colored blue.

Figure 7:
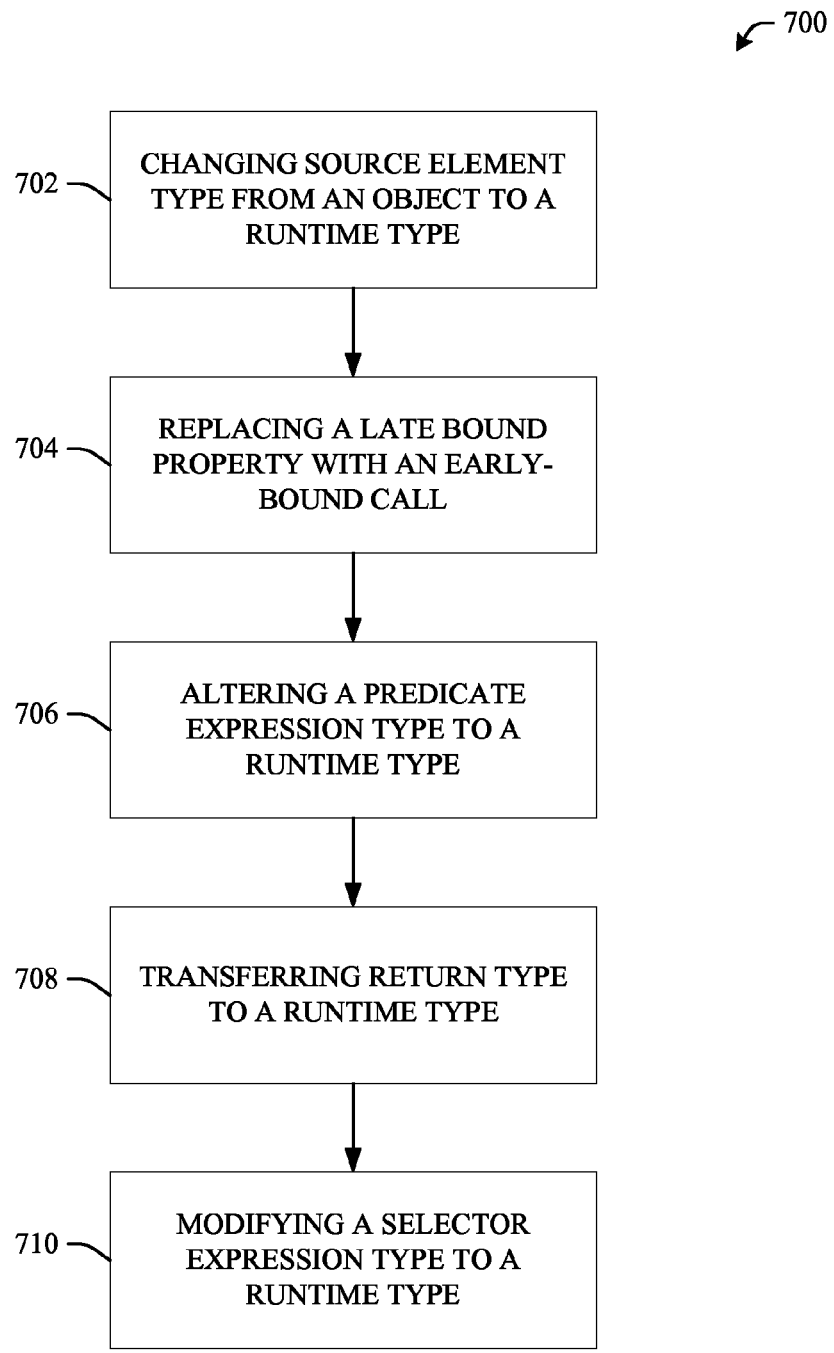
FIG. 7 illustrates a representative alteration methodology in accordance with an aspect of the subject specification.

FIG. 7 discloses an example methodology 700 for manipulation of an early-bound structure to a late-bound structure through method call replacement. The methodology 700 can implement principles modifying an expression tree 400 of FIG. 4 to an expression tree 500 of FIG. 5. There is changing source element type from an object to a runtime type 702. In one example, IQueryable source element type is changed from Object to generated runtime type (Car). This can take place with regard to the expression 520 of FIG. 5

Replacing a late-bound property with an early-bound call 704 occurs. In one implementation, there can be a late-bound property accessor replaced with a statically typed call. The statically typed call enables an early-bound configuration since a specific object (e.g., Car) is now known up completion of compiler operation. Event 704 replaces the method 416, property 418 and identifier 420 of FIG. 4 with an early-bound call 516 and an object identifier 518 of FIG. 5

There is altering a predicate expression type to a runtime type 706. A Predicate Lambda expression type can be changed to runtime type (e.g., Car). This alters a lambda expression 410 of FIG. 4 into a lambda expression 510 of FIG. 5. Action 708 is transferring return type to a runtime type. Return type of Where MethodCallExpression can be changed to runtime type (e.g., Car). This can change the method call 404 of FIG. 4 with the method call 504 of FIG. 5.

There is modifying a selector expression type to a runtime type 710. There is chancing a selector Lambda expression type is changed to runtime type (e.g., Car) as well as modifying a return type of Select MethodCallExpression changed to runtime type (e.g., Car). This can change the argument 404 of FIG. 4 with the argument 504 of FIG. 5 as well as object instance 406 of FIG. 4 to object instance 506 of FIG. 5.

Figure 8:
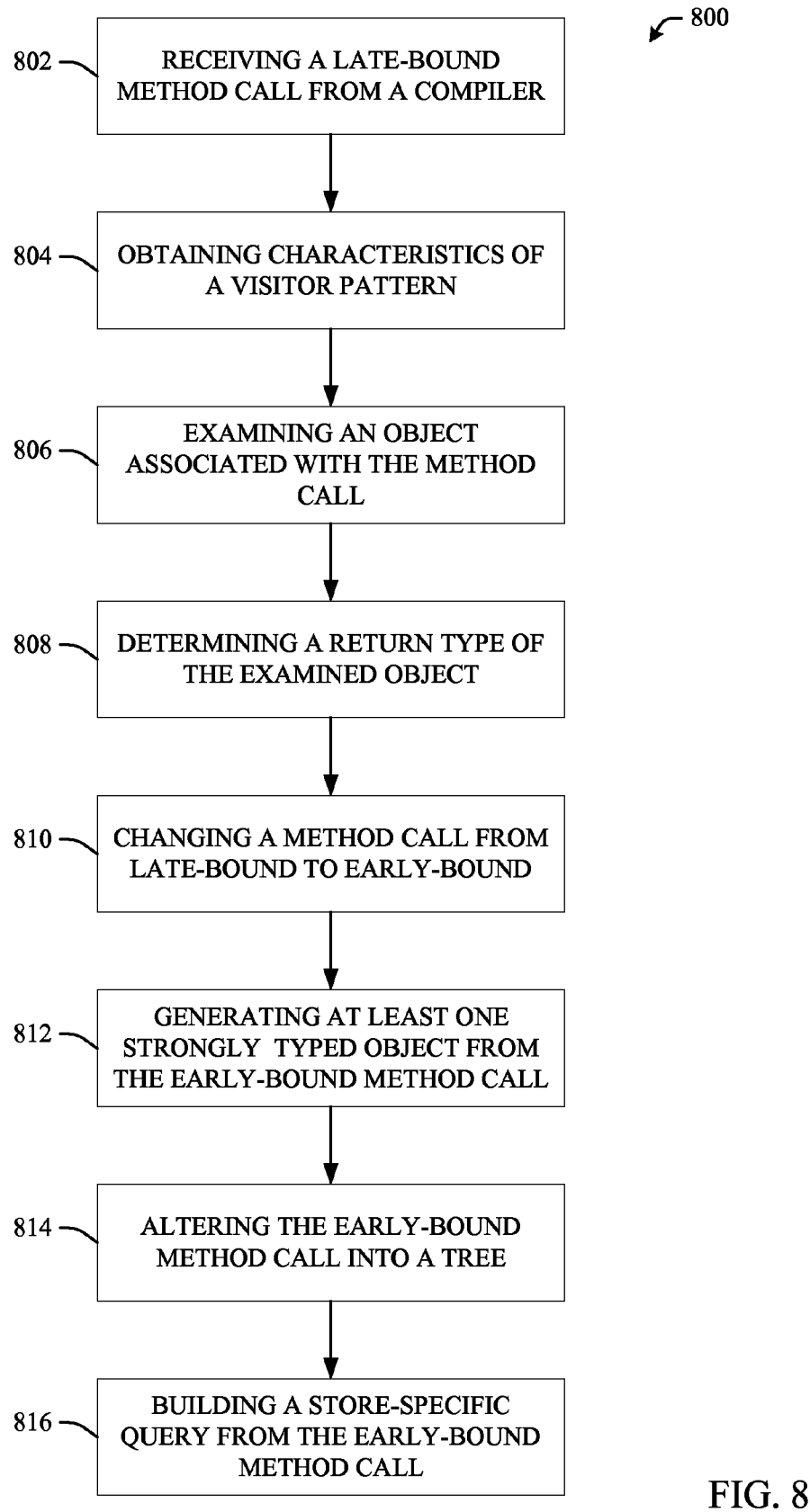
FIG. 8 illustrates a representative modification methodology in accordance with an aspect of the subject specification.

FIG. 8 discloses an example late-bound to early-bound transition methodology 800. There is receiving a late-bound method call from a compiler 802. At compile time, a compiler generates a late-bound expression in a target language from computer code written in a source language. Reception can take place according to various embodiments, including wireless transmission, hard-wired communication, etc.

Obtaining characteristics of a visitor pattern 804 takes place. A visitor pattern can be utilized in order to change the early-bound expression; however, different visitor patterns can be used. For instance, specific functions that are commonly used in a visitor pattern for a target language are determined (e.g., though use of artificial intelligence techniques).

There is examining an object associated with the method call 806 and determining a return type of the examined object 808. Examination allows for different aspects of the late-bound expression to be ascertained. Changing a method call from late-bound to early-bound 810 occurs. Through examination of the object, specific return types can be known. Due to this, method calls can be replaced with static types that enable improved functionality during runtime. Operation of event 810 can occur at runtime since there can be an inference on what objects are available.

There is generating at least one strongly typed object from the early-bound method call 812. Strong typing places restrictions on objects in a manner that lowers likelihood of runtime errors. Since information is known about the expression, type can be strong since there will be little to no modification at runtime.

Altering the early-bound method call into a tree 814 takes place. Changing the early-bound method call into a tree allows a query to be generated that is based upon the early-bound method call. Act 816 is building a store-specific query from the early-bound method call. Commonly, this takes place through the examination of the tree and structuring the query based upon information held in the tree and relationships thereof.

Figure 9:
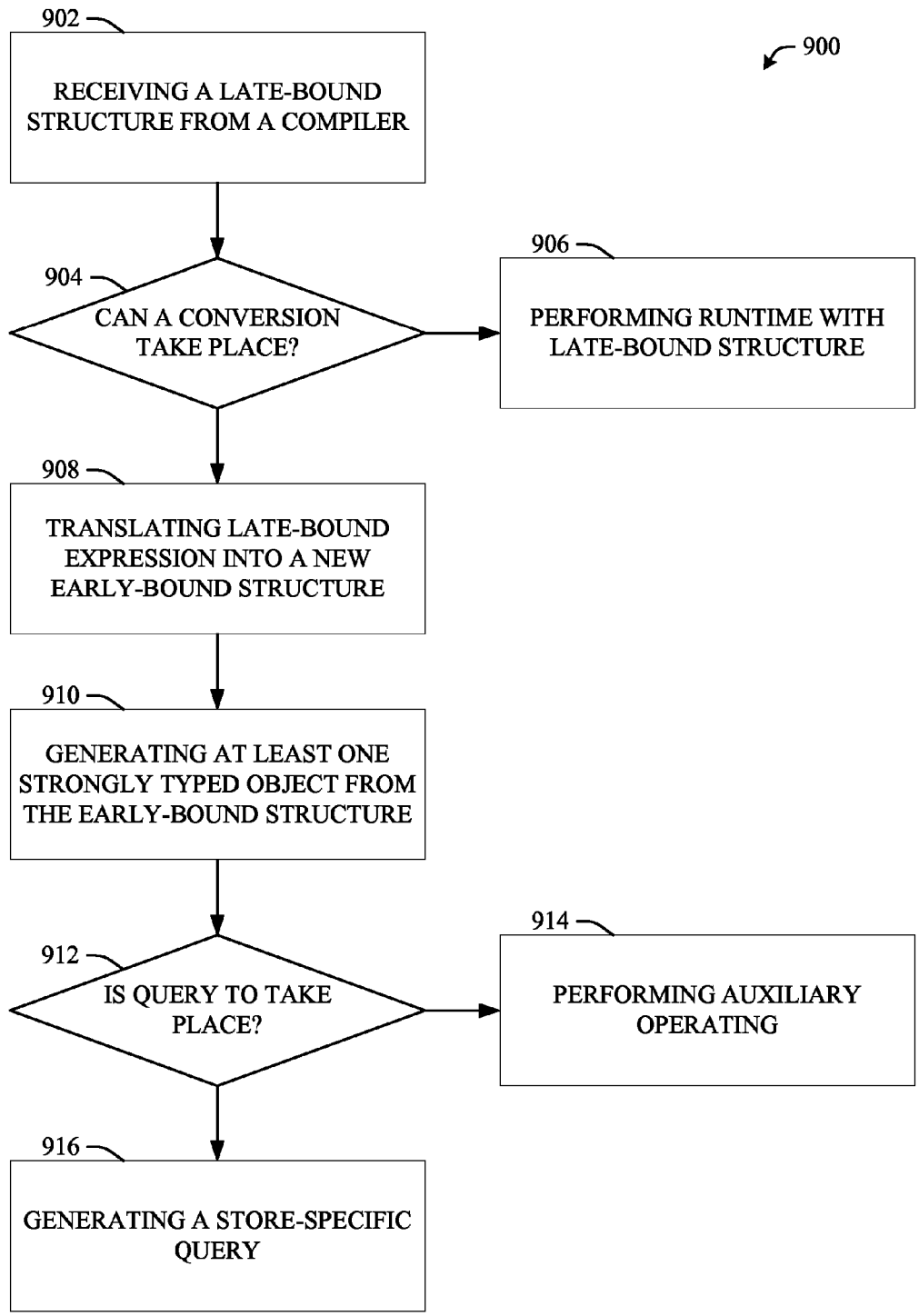
FIG. 9 illustrates a representative methodology for performing checks in relation to translating a structure from late-bound to early-bound in accordance with an aspect of the subject specification.

FIG. 9 is an example methodology 900 for determining if a transition between late-bound to early-bound can take place. There is receiving a late-bound structure from a compiler 902. Reception can take place wirelessly, in a hard-wired configuration, in an encrypted manner, etc. In addition, various error checks can take place, such as determining if the received structure is complete and if a received structure includes inconsistencies.

A check 904 takes place to determine if a late-bound structure can be converted into an early-bound expression. If a conversion cannot and/or should not take place, then there can be performing runtime with late-bound structure 906. There can be translating late-bound expression into early-bound expression 908. This can take place in a manner consistent disclosed in other portions of the subject specification (e.g., through replacing method calls with early-bound calls).

In addition, there can be generating at least one strongly typed object from the early-bound structure 910. This can be performed with aspects disclosed throughout the subject specification. A check 912 can occur to determine if there is to be a store specific query. There can be performing an auxiliary operation 914 if a query is not to take place. Generating a store-specific query 916 can take place to obtain information from a database.

Other actions can associate with the methodology 900 concerning application of the generated store specific query. For instances, there can be testing the query, applying the query upon a database, collecting and/or processing results of the query, etc.

The following discloses information concerning the general-purpose query facilities added to an example framework that applies to various sources of information.

The industry has reached a stable point in the evolution of object-oriented (OO) programming technologies. Programmers now take for granted features like classes, objects, and methods. In looking at the current and next generation of technologies, it has become apparent that the next big challenge in programming technology is to reduce the complexity of accessing and integrating information that is not natively defined using OO technology. The two most common sources of non-OO information are relational databases and general markup languages (e.g., XML).

Rather than add relational or general markup language-specific features to programming languages and runtime, there can be a more general approach and are adding general purpose query facilities to the a framework that apply to many sources of information, not just relational or general markup language data.

The term language integrated query is used to indicate that query is an integrated feature of the developer's primary programming languages (e.g., C#, Visual Basic). Language integrated query allows query expressions to benefit from the rich metadata, compile-time syntax checking, static typing and IntelliSense that was previously available only to imperative code. Language integrated query also allows a single general-purpose declarative query facility to be applied to all in-memory information, not just information from external sources.

The extensibility of the query architecture is used to provide implementations that work over both general markup language and structured query language data. The query operators over general markup language can use an efficient, easy-to-use in-memory facility to provide certain functionality in the host programming language. The query operators over relational data (DLinq) build on the integration of structure query language-based schema definitions into virtual machine type system. Integration provides strong typing over relational data while retaining the expressive power of the relational model and the performance of query evaluation directly in the underlying store.

To further demonstrate language integrated query at work, the following discloses an example that uses standard query operators to process contents of an array:

```
Imports System.Linq
Module Module1
    Sub Main( )
        Dim names( ) As String
        names = New String( ) {"Burke", "Connor", "Frank", _
            "Everett", "Albert", "George", _
            "Harris", "David"}
        Dim expr As IEnumerable(Of String)
        expr = From s In names Where s.Length = 5 _
            Order By s Select s.ToUpper( )
        For Each item As String In expr
            Console.WriteLine(item)
        Next
    End Sub
End Module
```

Compiling and running the above computer code produces an output:
BURKE
DAVID
FRANK In order to provide a context for the various aspects of the disclosed subject matter, FIGS. 10 and 11 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch ... ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Figure 10:
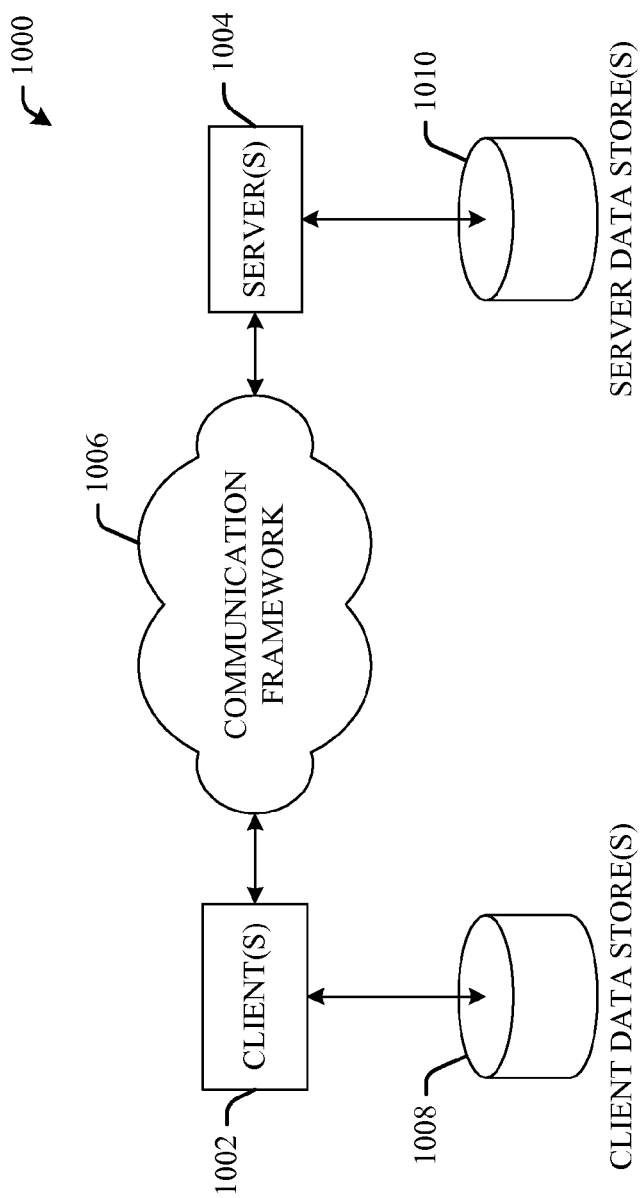
FIG. 10 illustrates an example of a schematic block diagram of a computing environment in accordance with the subject specification.

Referring now to FIG. 10, there is illustrated a schematic block diagram of a computing environment 1000 in accordance with the subject specification. The system 1000 includes one or more client(s) 1002. The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

Figure 11:
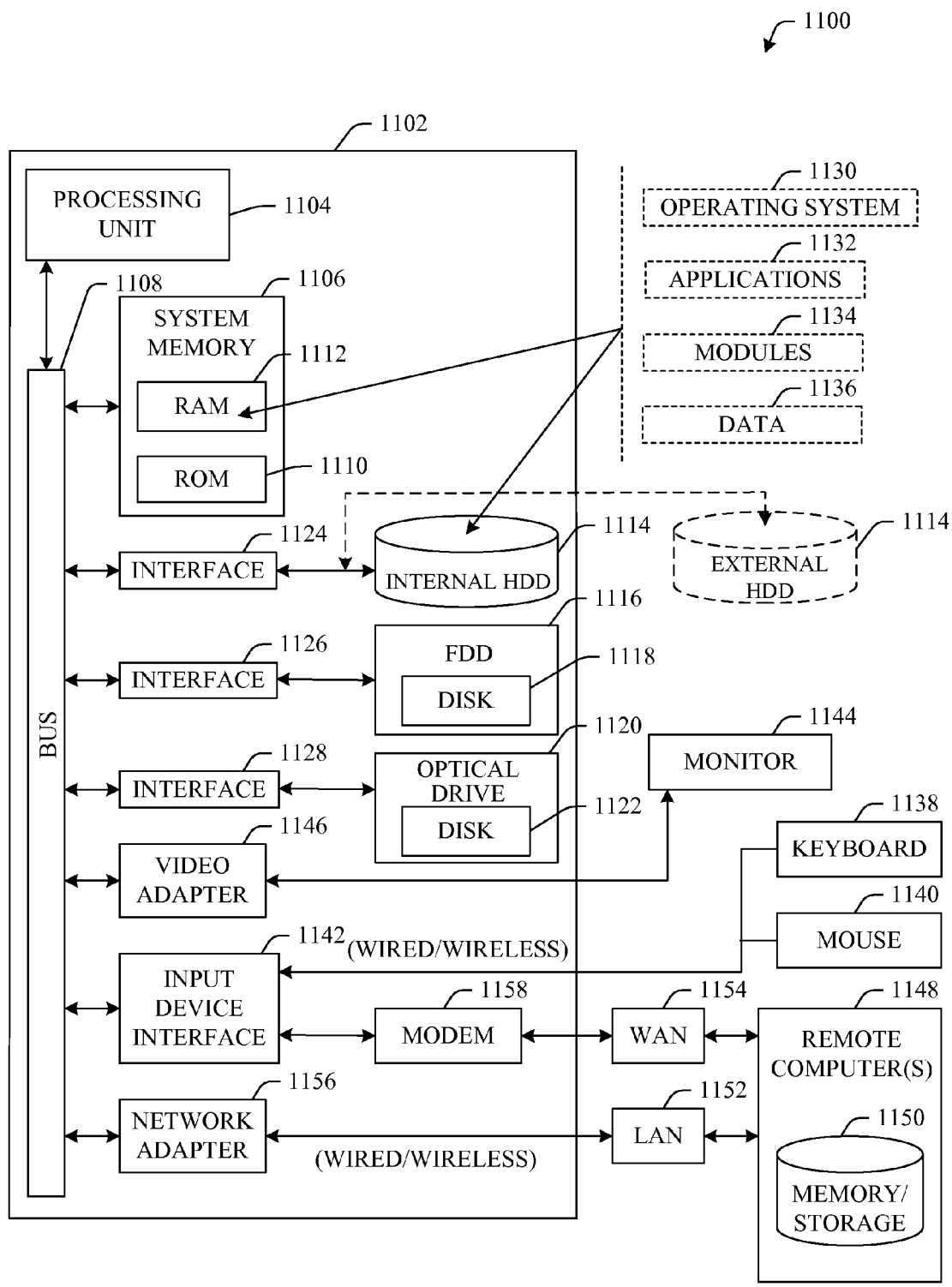
FIG. 11 illustrates an example of a block diagram of a computer operable to execute the disclosed architecture.

Referring now to FIG. 11, there is illustrated a block diagram of a computer operable to execute the disclosed architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising at least one processor and at least one computer-readable storage medium storing instructions executable by the at least one processor to implement:
    an obtainment component configured to collect a late-bound structure;

an alteration component configured to convert a late-bound structure into an early-bound structure; and a change component configured to transform at least a portion of the late-bound structure to a strong type, the change component further configured to allocate restrictions on data types of a compiled structure.

2. The system of claim 1, the change component further configured to restrict a transformation of the late-bound structure to data types that would not cause an error at runtime.

3. The system of claim 1, the alteration component being configured to operate runtime.

4. The system of claim 1, further comprising an artificial intelligence component configured to make a determination or inference about conversion of the late-bound structure into the early-bound structure.

5. The system of claim 1, further comprising an analysis component configured to evaluate the collected late-bound structure.

6. The system of claim 5, the analysis component being configured to use a visitor pattern to convert the collected late-bound structure.

7. The system of claim 1, further comprising a modification component configured to arrange the early-bound structure into a tree.

8. The system of claim 1, further comprising a creation component configured to generate a store-specific query based upon the early-bound structure.

9. A method, comprising using at least one processor to execute instructions stored in at least one computer-readable storage medium, the instructions in response to execution causing operations including:

changing a method call from late-bound to early-bound; and generating at least one strongly typed object from the early-bound method call;

allocating restrictions on data types included in the early-bound method call, the restrictions associated with the at least one strongly typed object.

10. The method of claim 9, further comprising examining an object associated with at least one of the late-bound method call or the early-bound method call.

11. The method of claim 10, further comprising performing examination of the object associated with the method call through utilization of a visitor pattern.

12. The method of claim 9, further comprising determining a return type of the examined object.

13. The method of claim 9, further comprising receiving a late-bound method call from a compiler.

14. The method of claim 9, further comprising building a store specific query from the early-bound method call.

15. The method of claim 9, further comprising altering the early-bound method call into a tree.

16. A computer-readable storage medium storing instructions, the instructions configured to, in response to execution by one or more computing devices, cause operations comprising:

translating a late-bound expression into an early-bound expression;

generating a store specific query based upon the early-bound expression; and transforming at least a portion of the late-bound structure to a strong type, the strong type facilitating an allocation of restrictions on data types of a compiled structure.

17. The computer-readable storage medium of claim 16, the operations further comprising analyzing the late-bound expression.

18. The computer-readable storage medium of claim 16, the operations further comprising passing the early-bound expression to an entity implementation.

19. The computer-readable storage medium of claim 16, the operations further comprising modifying the early-bound query to a tree.

20. The computer-readable storage medium of claim 16, the operations further comprising changing source code into the late-bound expression.

* * * * *